US 8,169,727 B2

(12) United States Patent
Fong et al.

(10) Patent No.: US 8,169,727 B2
(45) Date of Patent: May 1, 2012

(54) APPARATUS AND METHOD FOR STABILIZING SLIDER FLYING HEIGHT OVER A DISCRETE TRACK MEDIA DISK SURFACE IN A HARD DISK DRIVE

(76) Inventors: Walton Fong, San Jose, CA (US); Brian Thornton, Mountain View, CA (US)

(*) Notice: Subject to any disclaimer, the term of this patent is extended or adjusted under 35 U.S.C. 154(b) by 146 days.

(21) Appl. No.: 12/473,198

(22) Filed: May 27, 2009

(65) Prior Publication Data

US 2010/0302674 A1    Dec. 2, 2010

(51) Int. Cl.
*G11B 5/09* (2006.01)
(52) U.S. Cl. .......................................................... 360/48
(58) Field of Classification Search .................... 360/48, 360/75, 46; 369/124.07
See application file for complete search history.

(56) References Cited

U.S. PATENT DOCUMENTS

| 5,245,598 | A  | * | 9/1993  | Burroughs ................. 369/44.28 |
| 5,377,178 | A  | * | 12/1994 | Saito et al. ................ 369/124.07 |
| 6,088,176 | A  | * | 7/2000  | Smith et al. .................... 360/46 |
| 6,122,233 | A  | * | 9/2000  | Iketani et al. ................ 369/44.26 |
| 6,337,839 | B1 | * | 1/2002  | Nakane et al. ............. 369/59.25 |
| 6,967,798 | B2 | * | 11/2005 | Homola et al. ................. 360/48 |
| 7,597,792 | B2 | * | 10/2009 | Homola et al. ............... 205/666 |
| 2003/0090825 | A1 | * | 5/2003  | Schep et al. .................... 360/48 |
| 2004/0174630 | A1 | * | 9/2004  | Nishihira ........................ 360/75 |

* cited by examiner

*Primary Examiner* — Fred Tzeng

(57) ABSTRACT

This application discloses a hard disk drive and a disk employing Discrete Tracks each including a land with a groove at a first depth with sectors of each track separated by servo pattern wedges with a variable second land and a variable second groove possessing widths and a second depth for the grooves differing from the first widths and depth of the groove of the sectors. The second depth optimizes the stability of the flying height of a slider over both sectors and servo pattern wedges, removing the possibility of added vibrational modes adversely affecting the slider's normal operations of reading, writing and flying above the disk surface. This also discloses the disks and their manufacture of disk surfaces with these sector zones and servo pattern wedges.

16 Claims, 3 Drawing Sheets

Fig. 2B
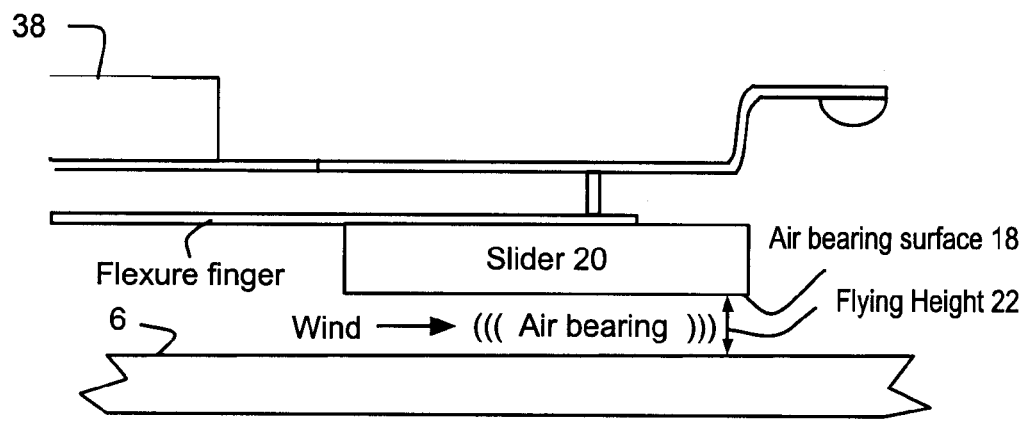
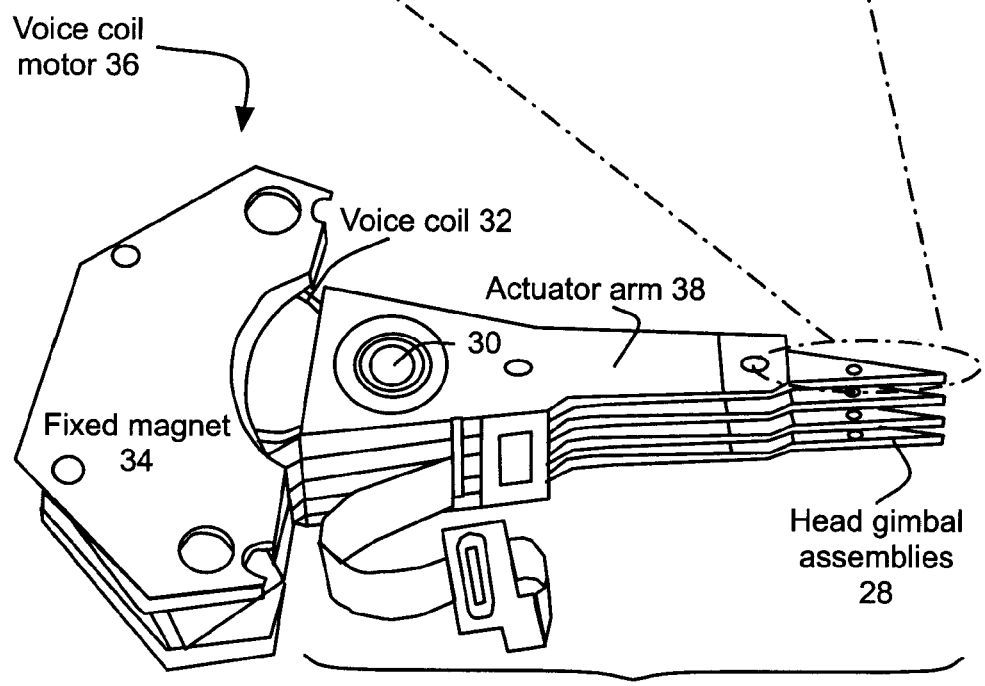
Fig. 2A

APPARATUS AND METHOD FOR STABILIZING SLIDER FLYING HEIGHT OVER A DISCRETE TRACK MEDIA DISK SURFACE IN A HARD DISK DRIVE

TECHNICAL FIELD

This invention relates to the disk surface of a Discrete Track Media (DTM) disk in a hard disk drive and the reduction of fluctuations in the flying height of a slider over a track on a rotating disk surface.

BACKGROUND OF THE INVENTION

At present, there is no hard disk drive in production that uses a Discrete Track Media disk surface, and consequently, the problem this invention addresses is not yet well known in the prior art. With that said, it is well known that anything that causes fluctuations in the flying height of a slider above a rotating disk surface induces noise and that noise tends to reduce the reliability of the hard disk drive.

SUMMARY OF THE INVENTION

Discrete Track Media (DTM) disk surfaces may partition a disk surface into sector zones between servo pattern wedges with each track including sectors in the sector zones and servo patterns in the servo pattern wedges. Each track in its sectors may include a land above of a groove at a first depth. The radial width of the land and the groove may be close to constant within manufacturing tolerances. The servo patterns may have varying widths to their lands and grooves, known hereafter as the second lands and the second grooves, or completely different patterns of data not in a track format. A problem may arise when the ratio of the average width of the second lands and the second grooves varies from the ratio of the lands and grooves. If the second depth from the second land to the second groove is the same as the first depth, the air bearing pressure of a slider flying over the servo pattern may fluctuate compared to the sector, adversely affecting flying height stability thereby injecting noise into the operation of the hard disk drive.

Embodiments of the invention include a hard disk drive comprising a disk base, a spindle motor mounted on the disk base and to rotate at least one disk to create at least one rotating disk surface, and a head stack assembly pivotably coupled to the disk base to position at least one slider at a flying height over the rotating disk surface where the second depth differs from the first depth. The difference may be at least two nanometers.

Embodiments of the invention include the disk with this disk surface and the method of manufacturing the disk including two process steps, one to create the grooves at the first depth and the second to create the second grooves at the second depth.

BRIEF DESCRIPTION OF THE DRAWINGS

FIG. 2A shows a perspective view of the voice coil motor, its head stack assembly and the one or more head gimbal assemblies coupled to the one or more actuator arms of FIG. 1.

FIG. 2B shows a side view of some details of a head gimbal assembly positioning the slider over the rotating disk surface near the track. The slider includes an air bearing surface that interacts with the airflow induced by the disk surface rotating to form an air bearing that floats the slider at a flying height above that surface.

DETAILED DESCRIPTION

Figure 3:
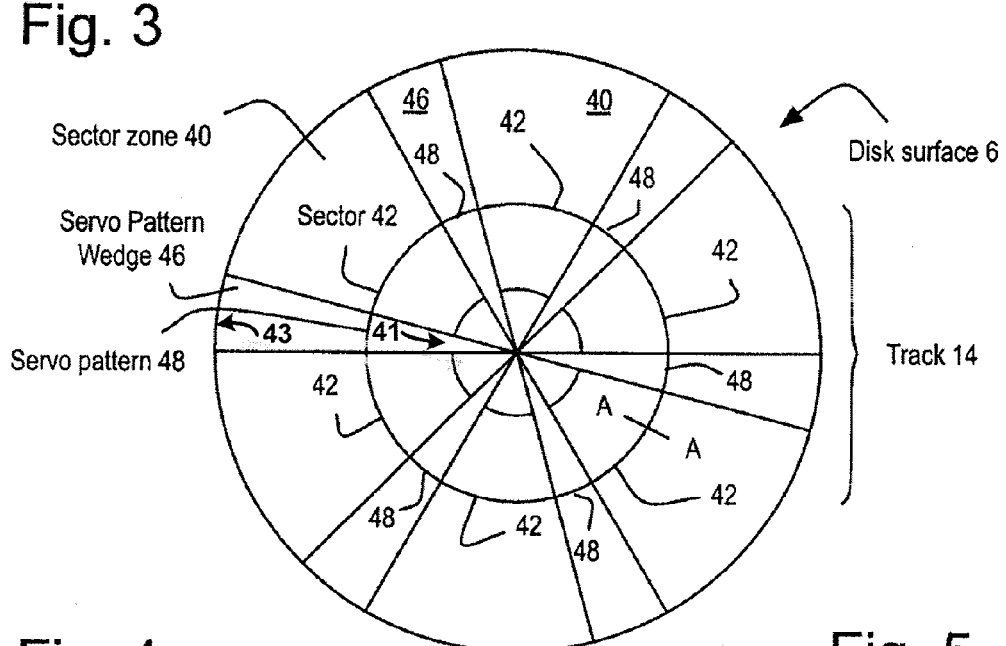
FIG. 3 shows the disk surface comprised of at least two sector zones and at least two servo pattern wedges with a servo pattern wedge between each of the sectors of the track from FIG. 1. In a Discrete Track Media (DTM) disk as shown in FIGS. 4 and 5, the disk surface is usually not planar.
Figure 4:
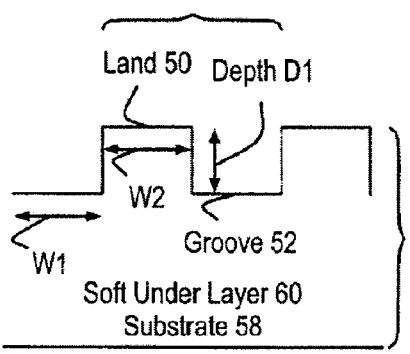
FIG. 4 shows the radial cross section of the disk taken through the A-A line in FIG. 3, showing that each of the tracks includes a land and a groove at a first depth D1 with the groove having a first width of W1 and the land having a second width of W2.
Figure 5:
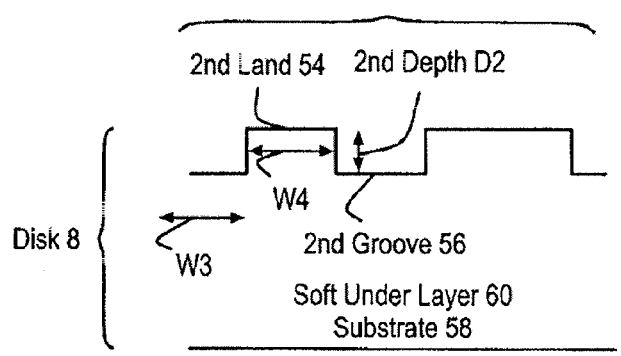
FIG. 5 shows a circumferential cross section of the disk for the track over the servo pattern wedge, known herein as the servo pattern, with a second depth D2 for the second grooves from the second lands. The second depth differs from the first depth to preferably minimize changes in the flying height of the slider passing over the servo pattern wedge from the flying height over the sectors without vertical micro-actuation. The circumferential cross section may be locally perpendicular to the radial cross section of FIG. 4.
Figure 6:
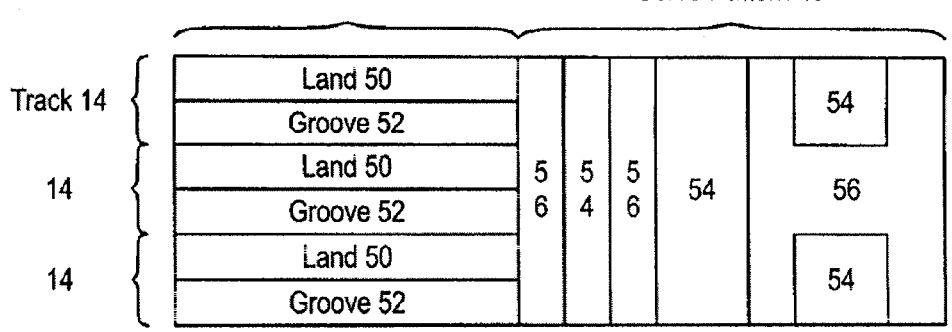
FIG. 6 shows a top view of part of the disk surface with the sectors having the land and the groove of the tracks running circumferentially, approximated here as horizontal strips, whereas the servo patterns have the second lands and the second grooves vary in a radial pattern, leading to considering the third width W3 of the second grooves of FIG. 5 being based upon what is needed to generate the correct servo pattern for the recording system. Similarly, the fourth width W4 may be determined similarly for the second lands 54.

This invention relates to the disk surface of a Discrete Track Media (DTM) disk in a hard disk drive and the reduction of fluctuations in the flying height of a slider over a track on a rotating disk surface. Discrete Track Media (DTM) disk surfaces may partition a disk surface into data sector zones between servo pattern wedges with each track including sectors in the data sector zones and servo patterns in the servo pattern wedges as shown in FIG. 3. Each track in its sectors may include a land above a groove of a first depth as shown in FIG. 4. The radial width of the land and the groove may be close to constant within manufacturing tolerances. The servo patterns may well have varying widths to their lands and grooves, known hereafter as the second lands and the second grooves as shown in FIG. 5. A problem may arise when the orientation and the ratio of the average width of the second lands and the second grooves varies from that of the lands and grooves as shown in FIG. 6. Due to abrupt changes in orientation and the width of lands and grooves in the servo pattern area, if the second depth from the second land to the second groove is the same as the first depth, the air bearing pressure of a slider flying over the servo pattern may fluctuate compared to the sector. This dynamic fluctuation adversely affects flying height stability, thereby injecting noise into the operation of the hard disk drive.

Figure 1:
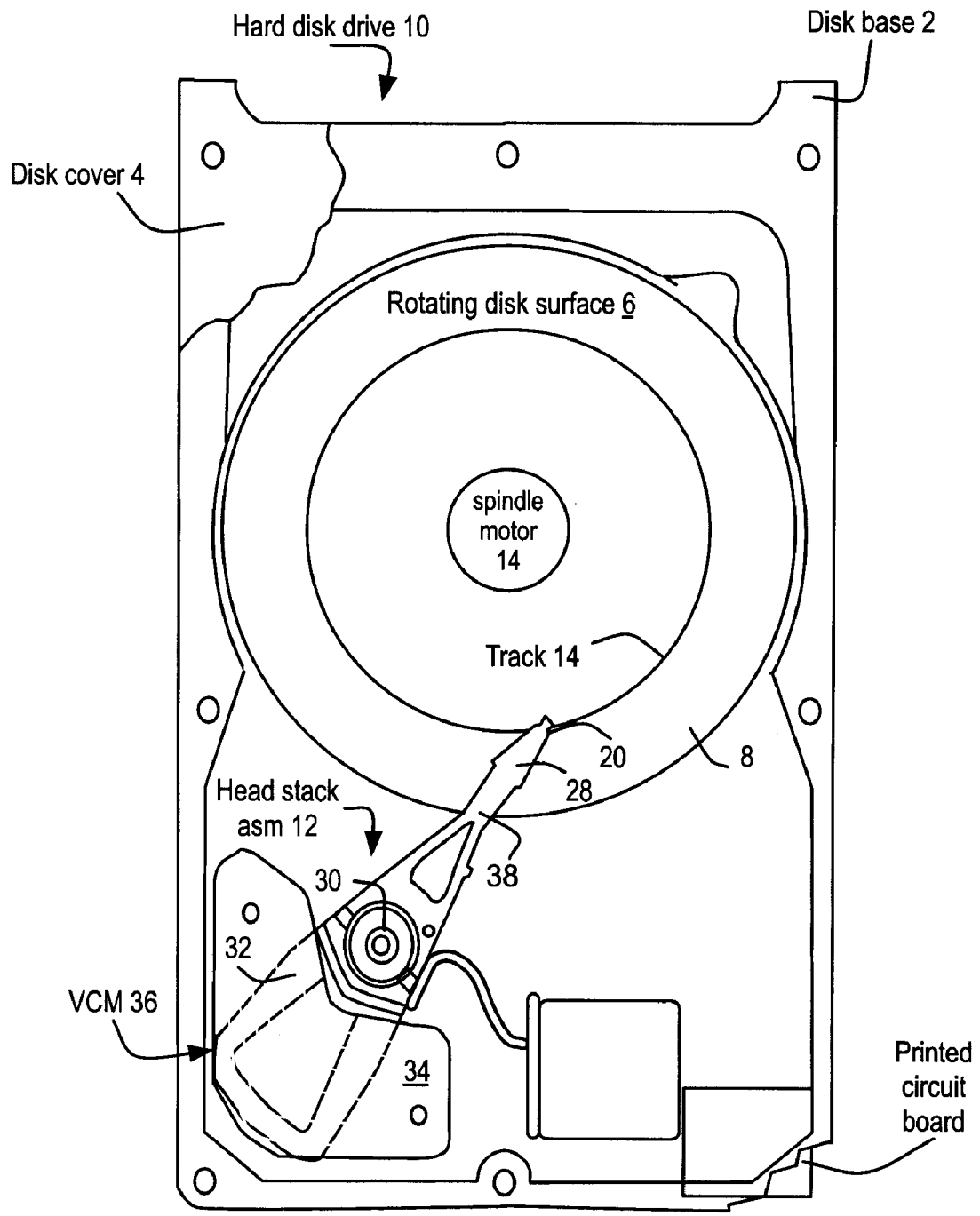
FIG. 1 shows an example of an embodiment of the invention as a hard disk drive including a disk base to which a spindle motor is mounted with at least one disk rotatably coupled to the spindle motor to create a rotating disk surface. A head stack assembly is configured to pivot on the disk base to position at least one slider to access a track on the rotating disk surface.

Referring to the drawings more particularly by reference numbers, FIG. 1 shows an example of an embodiment of the invention as a hard disk drive 10 including a disk base 2 to which a spindle motor 11 is mounted with at least one disk 8 rotatably coupled to the spindle motor to create a rotating disk surface 6. A voice coil motor 36 includes a head stack assembly 12 pivotably mounted by an actuator pivot 30 to the disk base, responsive to its voice coil 32 interacting with a fixed magnetic assembly 34 mounted on the disk base and coupled through an actuator arm to a head gimbal assembly 28 configured to position at least one slider 20 to access data stored in a track 14 on the rotating disk surface. The hard disk drive includes an assembled circuit board also mounted on the disk base opposite the spindle motor and the voice coil motor. A disk cover 4 is mounted on the disk base to encapsulate all of the shown components except the assembled circuit board.

The hard disk drive 10 preferably accesses the data arranged in tracks 14 on the rotating disk surface 6 by controlling the spindle motor 14 to rotate the disks 8. The tracks may be configured as concentric circles or as a tightly packed spiral. The voice coil motor 36 stimulates the voice coil 32 with a time varying electrical signal to magnetically interact with the fixed magnet assembly 34 causing the head stack assembly 12 to pivot about the actuator pivot 30 moving the head gimbal assembly 28 to position the slider 20 near the track. In many embodiments, a micro-actuator assembly coupled to the slider may be further stimulated to further control the position of the slider. A vertical micro-actuator either in the micro-actuator assembly, or preferably in the slider, may be stimulated to alter the flying height of the slider over the rotating disk surface.

FIG. 2A shows a perspective view of the voice coil motor 36, its head stack assembly 12 and the one or more head gimbal assemblies 28 coupled to the one or more actuator arms 40 of FIG. 1. The head stack assembly is configured to pivot about the actuator pivot 30.

FIG. 2B shows a side view of some details of the head gimbal assembly 28 of the previous Figures, in particular the head gimbal assembly couples the actuator arm 40 to the slider 20 to aid in positioning the slider over the rotating disk surface 6 near a track 14. The slider includes an air bearing surface 18 configured to face the rotating disk surface 6 while the slider is accessing data. The air bearing surface, the rotating disk surface and the airflow induced by the disk surface rotating interact to form an air bearing that floats the slider at a flying height 22 above the disk surface.

The slider 20 may use a perpendicular or longitudinal recording approach to accessing data of the track 14 on the rotating disk surface 6 and may employ a magneto-resistive effect or a tunneling effect to read the data. The slider may include a vertical and/or horizontal micro-actuator or the flexure finger may include a vertical and/or horizontal micro-actuator. Either approach to vertical and/or horizontal micro-actuation may employ a thermal-mechanical effect, a piezo-electric effect, and/or an electro-static effect. The vertical actuator may be used to alter the flying height 22. This application will refer to the vertical actuator being active as pushing the slider toward the rotating disk surface, which will be referred to as vertical actuation of the slider over the rotating disk surface.

FIG. 3 shows the disk surface 6 comprised of at least two sector zones 40 between adjacent servo pattern wedges 46 with each of the tracks 14 including a sector 42 in each of the sector zones and a servo pattern 48 in each of the servo pattern wedges. In a Discrete Track Media (DTM) disk 8 as shown in FIGS. 4 and 5, the disk surface may not be planar. The two basic operations involved with accessing data in the track, seeking the track and following the track for data access are both affected by the DTM disk format discussed in FIGS. 4 to 6. The servo pattern wedges 46 can extend radially from a servo wedge inner edge 41 to a servo wedge outer edge 43.

FIG. 4 shows the radial cross section of the disk taken through the A-A line in FIG. 3, showing that each of the tracks 14 includes a land 50 and a groove 52 at a first depth D1 with the groove having a first width of W1 and the land having a second width of W2.

FIG. 5 shows a circumferential cross section of the disk at a servo pattern 48 for the track 14 in the servo pattern wedge 46, with a second depth D2 for the second grooves 56 from the second lands 54 that minimizes changes in the flying height 22 of the slider 20 passing over the servo pattern wedge from the flying height over the sectors 42. The circumferential cross section is locally perpendicular to the radial cross section of FIG. 4.

As shown in the top view of part of the disk surface 6 in FIG. 6, the sectors 42 have the lands 50 and the grooves 52 of the tracks 14 running circumferentially, approximated here as horizontal strips, whereas the servo pattern wedge 46 finds the second lands 54 and the second grooves 56 forming a varying radial pattern, leading to considering the third width W3 of the second grooves of FIG. 5 being based upon what is needed to generate the correct servo pattern for the recording system. Similarly, the fourth width W4 may be determined similarly for the second lands 54. The second lands 54 can be formed radially in the sector pattern wedge 46 and contiguously between the servo wedge inner edge 41 of FIG. 3 and the servo wedge outer edge 43 of FIG. 3.

The lands 50 and the second lands 54 may be at the same elevation above the soft under layer 609 and the substrate 58, as indicated in FIGS. 4 and 5 to within a small tolerance, possibly within one or two nanometers across the disk surface 6. Further, the first depth D1 may be at least two nanometers. It may be greater than ten nanometers, possibly greater than twenty nanometers, and further possibly greater than thirty nanometers. The second depth D2 differs from the first depth by at least two nanometers. It may be less than seventy percent of the first depth, possibly further less than fifty percent of the second depth. In other embodiments, the second depth may be larger than the first depth.

Seeking the track 14 may include turning off vertical actuation to reduce the force acting on the slider 20 to maximize the flying height 22. As the slider passes the sectors 42 and the servo patterns 48, the first depth D1 and the second depth D2 are optimized to minimize fluctuations in the flying height, thereby minimizing the probability of unwanted contact with the disk surface 6.

Following the track 14 may include turning off vertical actuation of the slider 20 over the servo pattern 48 while turning on vertical actuation over the sector 42. Minimizing the pressure fluctuations of the air bearing may limit mechanical vibration resonances thereby aiding the access of the data of the track.

Embodiments of the invention include the disk 8 with this disk surface 6 and the manufacturing of the disk surface including two process steps, one to create the grooves 52 at the first depth D1 and the second to create the second grooves 56 at the second depth D2. The first width W1 plus the second width W2 may approximate the track 14 pitch, which may be not more than one hundred nanometers.

In some embodiments of the invention, the first depth D1 may be greater than the second depth D2. The process step making the second grooves 56 at the second depth may occur before the step making the first grooves 52 at the first depth. Alternatively, the first depth D1 may be less than the second depth D2. Similarly, making the first grooves 52 may occur before the second grooves 56.

The preceding embodiments provide examples of the invention, and are not meant to constrain the scope of the following claims.

What is claimed is:

1. A hard disk drive, comprising:

a disk base;

a spindle motor mounted on said disk base and rotatably coupled to at least one disk to create at least one rotating disk surface including at least two sector zones and at least two servo pattern wedges; and a head stack assembly pivotably mounted to said disk base to position at least one slider at a flying height over said rotating disk surface near a track comprising a data sector in said sector zone, for each sector zone and a servo pattern in said servo pattern wedge, for each of said servo pattern wedges, with a radial cross section of said data sector including a land of a first width above a groove of a second width by a first depth, with a circumferential cross section of said servo pattern including a second land of a fourth average width above a second groove of a third average width at a second depth differing from said first depth and having the second land formed radially in the servo pattern wedge and contiguously between a servo wedge inner edge and a servo wedge outer edge.

2. The hard disk drive of claim 1, wherein said first width plus said second width is at most one hundred nanometers.

3. The hard disk drive of claim 1, wherein said first depth is at least five nanometers.

4. The hard disk drive of claim 1, wherein said second depth differs from said first depth by at least two nanometers.

5. The hard disk drive of claim 4, wherein said second depth differs from said first depth by at least ten nanometers.

6. A disk for use in a Discrete Track Media hard disk drive, comprising:

at least one disk surface comprising at least two sector zones each separated by a servo pattern wedge and a plurality of tracks, with each of said tracks comprising a data sector in said sector zone, for each of said sector zones and a servo pattern in said servo pattern wedge, for each of said servo pattern wedges, with a radial cross section of said data sector including a land of a first width above a groove of a second width by a first depth, with a circumferential cross section of said servo pattern including a second land of a fourth average width above a second groove of a third average width at a second depth differing from said first depth and having the second land formed radially in the servo pattern wedge and contiguously between a servo wedge inner edge and a servo wedge outer edge.

7. The disk of claim 6, wherein said first width plus said second width is at most one hundred nanometers.

8. The disk of claim 6, wherein said first depth is at least five nanometers.

9. The disk of claim 6, wherein said first depth differs from said second depth by at least two nanometers.

10. The disk of claim 9, wherein said second depth differs from said first depth by at least ten nanometers.

11. A method of manufacturing a disk for use in a Discrete Track Media hard disk drive, comprising the step of:

manufacturing at least one disk surface comprising at least two sector zones each separated by a servo pattern wedge and a plurality of tracks, with each of said tracks comprising a data sector in said sector zone, for each of said sector zones and a servo pattern in said servo pattern wedge, for each of said servo pattern wedges, with a radial cross section of said data sector including a land of a first width above a groove of a second width by a first depth, with a circumferential cross section of said servo pattern including a second land of a fourth average width above a second groove of a third average width at a second depth differing from said first depth and having the second land formed radially in the servo pattern wedge and contiguously between a servo wedge inner edge and a servo wedge outer edge;

wherein the step of manufacturing said disk surface further comprises the steps of:

making said first grooves at said first depth to create said disk surface with said first grooves; and making said second grooves at said second depth to create said disk surface with said second grooves.

12. The method of claim 11, wherein said first width plus said second width is at most one hundred nanometers.

13. The method of claim 11, wherein said first depth is at least five nanometers.

14. The method of claim 11, wherein said second depth differs from said first depth by at least two nanometers.

15. The method of claim 14, wherein said second depth differs from said first depth by at least ten nanometers.

16. The method of claim 11, wherein the step of making said second grooves is performed before the step of making said first grooves.

* * * * *